(12) United States Patent
Bessler

(10) Patent No.: US 6,438,978 B1
(45) Date of Patent: *Aug. 27, 2002

(54) REFRIGERATION SYSTEM

(75) Inventor: Warren Frank Bessler, Amsterdam, NY (US)

(73) Assignee: General Electric Company, Niskayuna, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,920

(22) Filed: Jan. 7, 1998

(51) Int. Cl.[7] ............................ F25D 17/00; F25B 41/04
(52) U.S. Cl. .............................. 62/179; 62/180; 62/223
(58) Field of Search ......................... 62/211, 223, 179, 62/180

(56) References Cited

U.S. PATENT DOCUMENTS

| | | | |
|---|---|---|---|
| 4,745,767 A | * 5/1988 | Ohya et al. | 62/211 |
| 5,272,884 A | 12/1993 | Cur et al. | 62/199 |
| 5,375,428 A | 12/1994 | LeClear et al. | 62/187 |
| 5,415,008 A | 5/1995 | Bessler | 62/212 |
| 5,425,246 A | 6/1995 | Bessler | 62/211 |
| 5,426,952 A | 6/1995 | Bessler | 62/211 |
| 5,435,145 A | 7/1995 | Jaster | 62/115 |
| 5,463,876 A | 11/1995 | Bessler et al. | 62/223 |

* cited by examiner

Primary Examiner—William Wayner
(74) Attorney, Agent, or Firm—Patrick K. Patnode; Christian G. Cabou (57) ABSTRACT

A refrigeration system disposed within an outer cabinet having a freezer compartment and a fresh food compartment comprises a freezer evaporator and a fresh food evaporator each having an inlet and an outlet. A compressor is coupled to the freezer evaporator via a conduit and a control valve is disposed at the inlet of the freezer evaporator to control refrigerant flow therethrough. A first liquid line temperature sensor is disposed so as to detect refrigerant temperature at the inlet of the freezer evaporator and a second liquid line temperature sensor is disposed so as to detect refrigerant temperature at the inlet of the fresh food evaporator. A freezer compartment temperature sensor and a fresh food compartment temperature sensor are disposed within the freezer compartment and the fresh food compartment, respectively, to sense compartment a temperatures. A controller is coupled to the control valve and to the compressor so as to provide control signals thereto and to the liquid line temperature sensors and the compartment temperature sensors to receive temperature signals therefrom. The controller generates control signals to the control valve in response to temperature signals generated from the liquid line temperature sensors and the compartment temperature sensors to modify the control valves duty cycle of open-to-closed conditions so as to maintain evaporator dryness at a relatively fixed level.

7 Claims, 6 Drawing Sheets

REFRIGERATION SYSTEM

BACKGROUND OF THE INVENTION

This application relates to refrigeration systems and more particularly relates to energy saving refrigeration systems.

Household refrigerators typically operate on a simple vapor compression cycle. Such a cycle typically includes a compressor, a condenser, an expansion device, and an evaporator connected in series and charged with a refrigerant. The evaporator is a specific type of heat exchanger which transfers heat from air passing over the evaporator to refrigerant flowing through the evaporator, thereby causing the refrigerant to vaporize. The cooled air is then used to refrigerate one or more freezer or fresh food compartments.

In conventional single-evaporator refrigerators, since the freezer compartment and the fresh food compartment are simultaneously cooled with one evaporator, the temperature of the evaporator must be maintained at a temperature lower than about −15° C., which is typically the temperature of the freezer compartment. Accordingly, an evaporator with a lower temperature than is necessary is used to cool the fresh food compartment, causing the efficiency of the overall system to be relatively low.

Other conventional refrigerators require at least two capillary tubes to control expansion. Each capillary tube is preceded in the refrigerant flow path by an electrically activated valve in order to control liquid discharge from the condenser to selectively flow through one of the capillary tubes. An air flow direction control scheme directs air flow to and from the sole evaporator to be either fresh food or freezer compartment air. When the air flow coupling is with the fresh food compartment (about 7° C.) the refrigerant operates at a relatively high evaporator saturation temperature and when the air flow coupling is with the freezer compartment (about −15° C.), the refrigerant operates at a relatively lower saturation temperature.

Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is substantially a saturated vapor. Accordingly, this is the purpose for two switchable capillary tubes. A higher evaporator saturation temperature produces a high pressure, thus a higher vapor density, thereby generating a greater compressor mass flow rate. To support a higher compressor mass flow rate, a less restrictive capillary tube is required. This system will work satisfactorily near operating conditions for which the capillary tubes were optimized. At off design conditions, however, the evaporator exit state will be either a vapor quality or superheat and cycle efficiency will be lower.

Additionally, during operation of conventional refrigeration systems, condensed moisture forms as frost or ice on the exposed surfaces of an evaporator. Since ice accumulation will eventually cause cycle efficiency degradation, the evaporator must periodically undergo a defrosting period.

Therefore, it is apparent from the above that there exists a need in the art for a simplified refrigeration expansion control and for improved defrosting within refrigeration systems.

SUMMARY OF THE INVENTION

A refrigeration system disposed within an outer cabinet having a freezer compartment and a fresh food compartment comprises a freezer evaporator and a fresh food evaporator each having an inlet and an outlet. A compressor is coupled to the freezer evaporator via a conduit and a control valve is disposed at the inlet of the freezer evaporator to control refrigerant flow therethrough. A first liquid line temperature sensor is disposed so as to detect refrigerant temperature at the inlet of the freezer evaporator and a second liquid line temperature sensor is disposed so as to detect refrigerant temperature at the inlet of the fresh food evaporator. A freezer compartment temperature sensor and a fresh food compartment temperature sensor are disposed within the freezer compartment and the fresh food compartment, respectively, to sense compartment temperatures. A controller is coupled to the control valve and to the compressor so as to provide control signals thereto and to the liquid line temperature sensors and the compartment temperature sensors to receive temperature signals therefrom. The controller generates control signals to the control valve in response to temperature signals generated from the liquid line temperature sensors and the compartment temperature sensors to modify the control valves duty cycle of open-to-closed conditions so as to maintain evaporator dryness at a relatively fixed level.

DETAILED DESCRIPTION OF THE INVENTION

Figure 1:
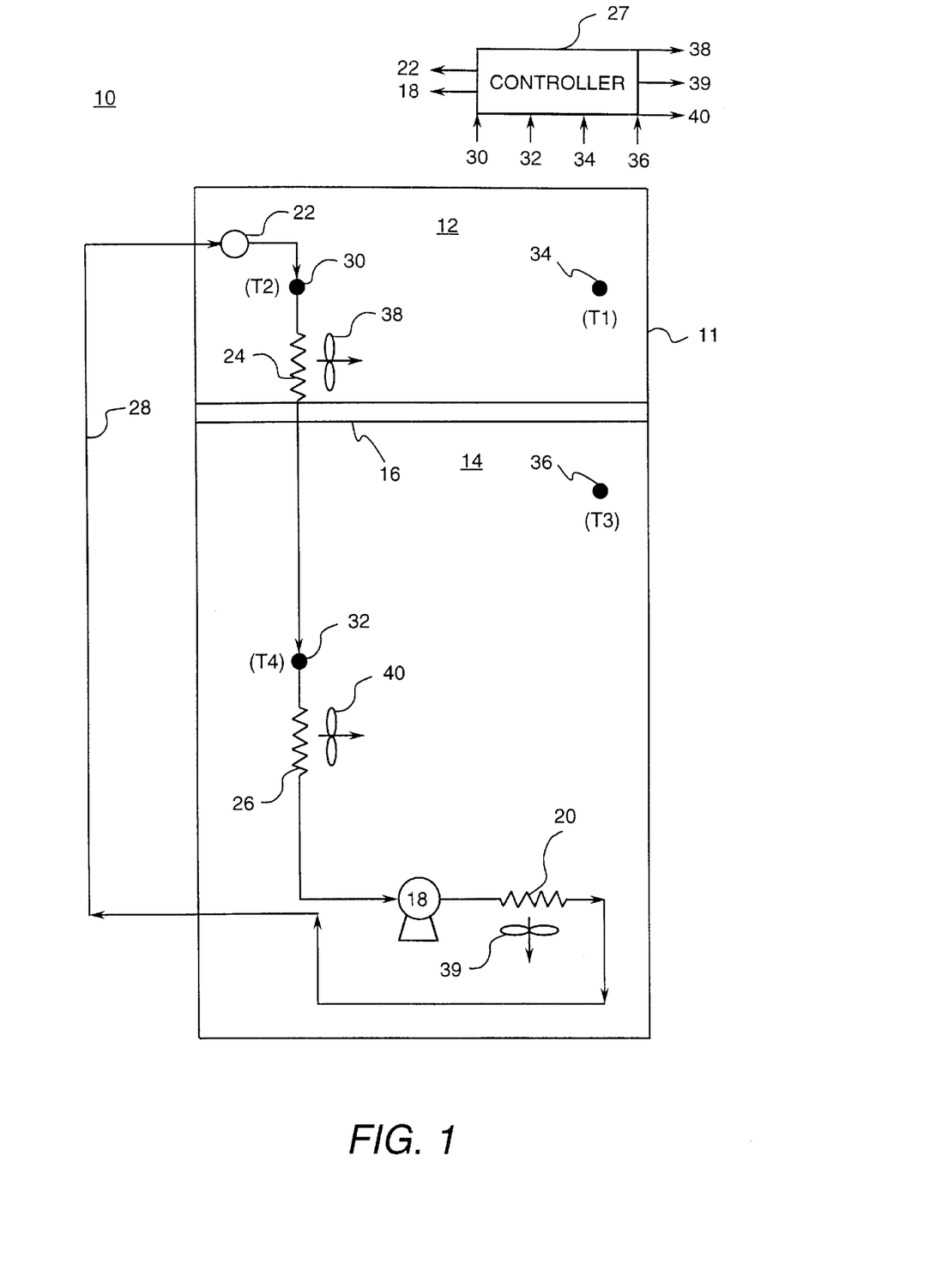
FIG. 1 is a schematic cross-sectional side elevation view of an illustrative embodiment of the instant invention.

An exemplary embodiment of a refrigeration system 10 includes an outer cabinet 11 having a freezer compartment 12 separated from and substantially temperature independent of a fresh food compartment 14, as shown in FIG. 1. A mullion 16 separates freezer compartment 12 and fresh food compartment 14. Although the present invention is described herein in connection with refrigeration system 10, the present invention is not limited to practice with refrigeration system 10. In fact, the present invention can be implemented and utilized with many other configurations.

Freezer and fresh food compartments 12, 14 typically comprise a housing formed with thermally insulated walls provided with an opening or a door for placement or removal of articles.

Refrigeration system 10 further comprises a compressor 18, a condenser 20, a control valve 22, a freezer evaporator 24 and a fresh food evaporator 26. Control valve 22 and compressor 18 are each electrically coupled to a controller 27.

Control valve 22, typically a solenoid valve, an electronic expansion valve (EEV), or the like, is disposed within a liquid line 28, which liquid line 28 connects condenser 20 and freezer evaporator 24. Control valve 22 is typically positioned adjacent the inlet of freezer evaporator 24 and is the throttling or metering device that controls the operation of refrigeration system 10. Control valve 22 is typically a closed valve, that is, control valve 22 closes when it is not energized. Control valve 22 may comprise a pulse width modulated valve and may be controlled by a method such as those described in commonly assigned U.S. Pat. Nos. 5,415,008, 5,425,246, 5,426,952 or 5,463,876, each of which is herein incorporated by reference.

A first liquid line temperature sensor 30 is disposed so as to detect the temperature of refrigerant prior to entering freezer evaporator 24 and a second liquid line temperature sensor 32 is disposed so as to detect the temperature of refrigerant prior to entering fresh food evaporator 26. Additionally, a freezer compartment temperature sensor 34 and a fresh food compartment temperature sensor 36 are disposed within freezer compartment 12 and fresh food compartment 14, respectively, to sense compartment temperatures. Temperature sensors 30–36 typically comprise solid state sensors such as resistance temperature detectors (RTD), thermocouples, thermistors or the like. Each temperature sensor 30–36 is electrically coupled to controller 27.

For purposes of clarity, the operation of refrigeration system 10 will be discussed in terms of a FREEZER MODE and a FRESH FOOD MODE. Although the exemplary embodiments will be discussed in terms of a FREEZER MODE and a FRESH FOOD MODE, the invention is not limited to these modes. In fact, the present invention can be implemented and utilized with many other modes of operation.

During operation, freezer compartment temperature sensor 34 and fresh food compartment temperature sensor 36 generate temperature signals, which temperature signals are received by controller 27.

If the temperature signals ($T_1$) generated by freezer compartment temperature sensor 34 rise above a preset freezer compartment temperature, typically in the range between about −20° C. to about −15° C., controller 27 enters FREEZER MODE.

During FREEZER MODE, controller 27 generates a compressor signal to activate compressor 18 and a condenser fan 39, a control signal to energize control valve 22 and a fan signal to activate a freezer compartment fan 38. High pressure gaseous refrigerant is discharged from compressor 18 and is condensed in condenser 20. The now-liquid refrigerant is expanded through control valve 22 to a lower pressure and flows to freezer evaporator 24. The refrigerant under low pressure, and correspondingly at a low temperature, enters freezer evaporator 24 where the refrigerant is evaporated in a conventional manner. The evaporation of the refrigerant lowers the temperature of the air surrounding freezer evaporator 24. The cooled air is directed by the rotation of freezer compartment fan 38 into freezer compartment 12.

If the temperature signals ($T_1$) generated by freezer compartment temperature sensor 34 drop below preset freezer compartment temperature cooling is no longer required and controller 27 exits FREEZER MODE. When controller 27 exits FREEZER MODE, controller 27 cuts the power to control valve 22 (unless simultaneously entering FRESH FOOD MODE) causing control valve 22 to move to a closed position, as discussed above. The closing of control valve 22 prevents refrigerant migration to freezer evaporator 24, thereby conserving energy. Control valve 22 therefore acts as an energy valve eliminating the need for a separate valve to serve this function.

One current problem with some commercially available refrigerators is that the freezer compartment and the fresh food compartment are simultaneously cooled with a single evaporator. Accordingly, the temperature of the single evaporator must be maintained at a temperature lower than the temperature of the freezer compartment. Therefore, an evaporator having a lower temperature than is necessary is used to cool the fresh food compartment, causing the efficiency of the overall system to be relatively low.

In accordance with one embodiment of the instant invention, during FREEZER MODE, the average flow rate through control valve 22 is dependent upon the selected duty cycle. Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is close to a saturated vapor. A higher evaporator saturation temperature produces a higher pressure thus a higher vapor density thereby generating a greater compressor mass flow rate.

To support a higher compressor mass flow rate, controller 27 generates a signal to control valve 22 so that the time ($t_1$) control valve 22 is fully open is increased with respect to the time ($t_2$) control valve is fully closed, thereby producing a larger average flow rate. To support a lower compressor mass flow rate, controller 27 generates a signal to control valve 22 so that the time ($t_1$) control valve 22 is fully open is lessened with respect to the time ($t_2$) control valve 22 is fully closed, thereby producing a relatively lower average flow rate.

Controller 27 generates control signals to control valve 22 on the basis of evaporator dryness. The level of dryness (i.e., the amount of liquid refrigerant) indicates whether freezer evaporator 24 requires more refrigerant. The difference between the air temperature in freezer compartment 12 and the refrigerant temperature at the inlet of freezer evaporator 24 can be correlated with the evaporator dryness. Generally, as this temperature difference increases, control valve 22 should be opened more to increase the refrigerant flow rate.

In order to ensure that freezer evaporator 24 exit state is a substantially saturated vapor, controller 27 monitors the temperature signals generated by first liquid line temperature sensor 30 ($T_2$) and the temperature signals generated by freezer compartment temperature sensor 34 ($T_1$). Controller 27 ensures a substantially saturated vapor exit state in freezer evaporator 24 by generating control signals to control valve 22. The control signals typically comprises a pulse width modulated frequency signal which causes control valve 22 to oscillate between a fully open condition and a fully closed condition such that the duty cycle of the open-to-closed conditions determines the average flow rate through control valve 22. The pulse width is adjusted in accordance with the detected evaporator dryness to maintain dryness at a relatively fixed level. Preferably, the difference between the air temperature in freezer compartment 12 ($T_1$) and the refrigerant temperature at the inlet of freezer evaporator 24 ($T_2$) is held at a fixed delta in the range between about 5° C. to about 10° C. By controlling the duty cycle of control valve 22 to maintain the desired evaporator dryness, optimal system performance is obtained.

If the temperature signals ($T_3$) generated by fresh food compartment temperature sensor 36 rise above a preset fresh food compartment temperature, typically in the range between about 3° C. to about 7° C., controller 27 enters FRESH FOOD MODE.

During FRESH FOOD MODE, controller 27 generates a compressor signal to activate compressor 18 and a condenser fan 39, a control signal to energize control valve 22 and a fan signal to activate a fresh food compartment fan 40. High pressure gaseous refrigerant is discharged from compressor 18 and is condensed in condenser 20. The now-liquid refrigerant is expanded through control valve 22 to a lower pressure and flows to fresh food evaporator 26. The refrigerant under low pressure, and correspondingly at a low temperature, enters fresh food evaporator 26 where the refrigerant is evaporated in a conventional manner. The evaporation of the refrigerant lowers the temperature of the air surrounding fresh food evaporator 26. The cooled air is directed by the rotation of fresh food compartment fan 40 into fresh food compartment 14.

If the temperature signals ($T_3$) generated by fresh food compartment temperature sensor 36 drop below preset fresh food compartment temperature, cooling is no longer required and controller 27 exits FRESH FOOD MODE. When controller 27 exits FRESH FOOD MODE, controller 27 cuts the power to control valve 22 (unless simultaneously entering FREEZER MODE) causing control valve 22 to move to a closed position, as discussed above.

In accordance with one embodiment of the instant invention, during FRESH FOOD MODE, the average flow rate through control valve 22 is dependent upon the selected duty cycle. Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is close to a saturated vapor. A higher evaporator saturation temperature produces a higher pressure thus a higher vapor density thereby generating a greater compressor mass flow rate.

In order to ensure that fresh food evaporator 26 exit state is a substantially saturated vapor, controller 27 monitors the temperature signals ($T_4$) generated by second liquid line temperature sensor 33 and the temperature signals ($T_3$) generated by fresh food compartment temperature sensor 36. Controller 27 ensures a substantially saturated vapor exit state in fresh food evaporator 26 by generating signals to control valve 22. This control signal typically comprises a pulse width modulated frequency signal which causes control valve 22 to oscillate between a fully open condition and a fully closed condition such that the duty cycle of the open-to-closed conditions determines the average flow rate through control valve 22. The pulse width is adjusted in accordance with the evaporator dryness to maintain dryness predicted by $T_3$ and $T_4$ at a relatively fixed level. Preferably, the difference between the air temperature in fresh food compartment 14 ($T_3$) and the refrigerant temperature at the inlet of fresh food evaporator 24 ($T_4$) is held at a fixed delta in the range between about 5° C. to about 10° C. By controlling the duty cycle of control valve 22 to maintain the desired evaporator dryness, optimal system performance is obtained.

Figure 2:
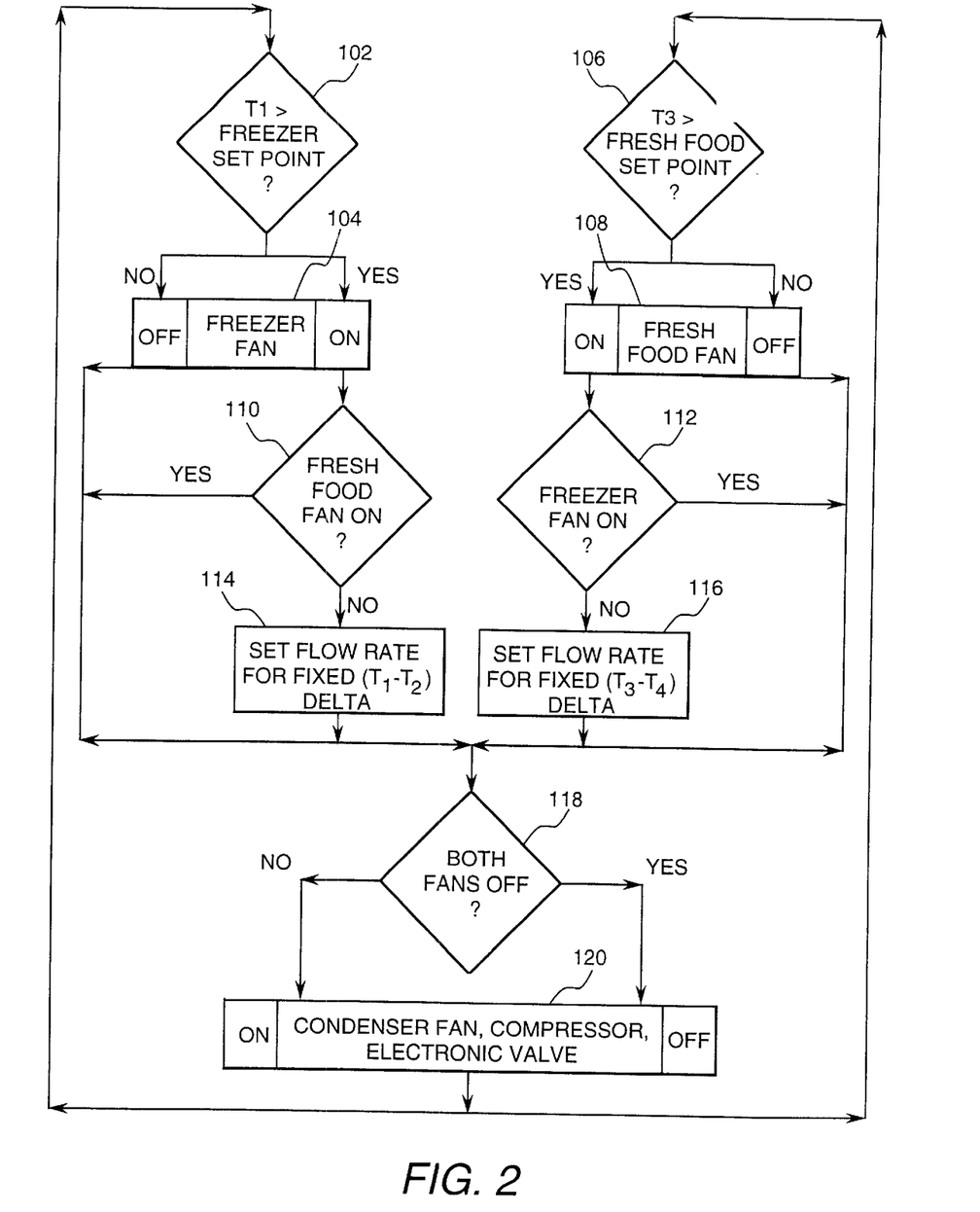
FIG. 2 is an exemplary control logic flowchart in accordance with one embodiment of the instant invention.

An exemplary control logic sequence 100 for refrigeration system 10 is shown in FIG. 2. This control logic sequence is inputted into controller 27, for example, by programming into memory of an application specific integrated circuit (ASIC) or other programmable memory device.

At block 102, the freezer compartment temperature ($T_1$) is monitored by controller 27 through freezer compartment temperature sensor 34. Controller 27 compares the temperature signals generated from freezer compartment temperature sensor 34 with the preset freezer temperature.

If $T_1$ is greater than the preset freezer temperature, the control sequence advances to block 104 and freezer compartment fan 38 is turned on. If, however, $T_1$ is less than or equal to the preset freezer temperature, the control sequence advances to block 104 and freezer compartment fan 38 remains off, or if previously on, freezer compartment fan 38 is turned off.

At block 106, the fresh food compartment temperature $T_3$ is monitored by controller 27 through fresh food compartment temperature sensor 36. Controller 27 compares the temperature signals generated from fresh food temperature sensor 36 with the preset fresh food temperature.

If $T_3$ is greater than the preset fresh food temperature, the control sequence advances to block 108 and fresh food compartment fan 40 is turned on. If, however, $T_3$ is less than or equal to the preset fresh food temperature, the control sequence advances to block 108 and fresh food compartment fan 40 remains off, or if previously on, fresh food compartment fan 40 is turned off.

If, at block 104, freezer compartment fan 38 is turned on, the control sequence advances to block 110 where controller 27 determines if fresh food compartment fan 40 is currently on, indicating cooling is currently taking place within fresh food compartment 14. If fresh food compartment fan 40 is not currently on, the control sequence advances to block 114 and the flow rate of control valve 22 is set for a fixed ($T_1$–$T_2$) delta, as discussed above.

If, at block 104, freezer fan 38 is turned off or remains off, the control sequence advances to block 118 where the controller determines if both fans are currently off.

If, at block 108, fresh food fan 40 is turned on, the control sequence advances to block 112 where controller 27 determines if freezer compartment fan 38 is currently on, indicating cooling is currently taking place within freezer compartment 12. If freezer compartment fan 38 is not currently on, the control sequence advances to block 116 and the flow rate of control valve 22 is set for a fixed ($T_3$–$T_4$) delta, as discussed above.

If, at block 108, fresh food fan 40 is turned off or remains off, the control sequence advances to block 118 wherein the controller determines if both fans are currently off.

At block 118, controller 27 determines if both fans 38, 40 are currently off. If controller 27 determines that both fans 38, 40 are currently off, the control sequence advances to block 120. At block 120, controller 27 generates a signal to shut off, condenser fan 39, compressor 18 and control valve 22, or if currently off to maintain that status, as neither freezer compartment 12 nor fresh food compartment 14 needs cooling.

If, at block 118, controller 27 determines that both fans 38, 40 are not currently off, the control sequence advances to block 120. At block 120, controller 27 generates a signal to turn on, condenser fan 39, compressor 18 and control valve 22, or if currently on to maintain that status, as either freezer compartment 12 or fresh food compartment 14 currently requires cooling.

Figure 3:
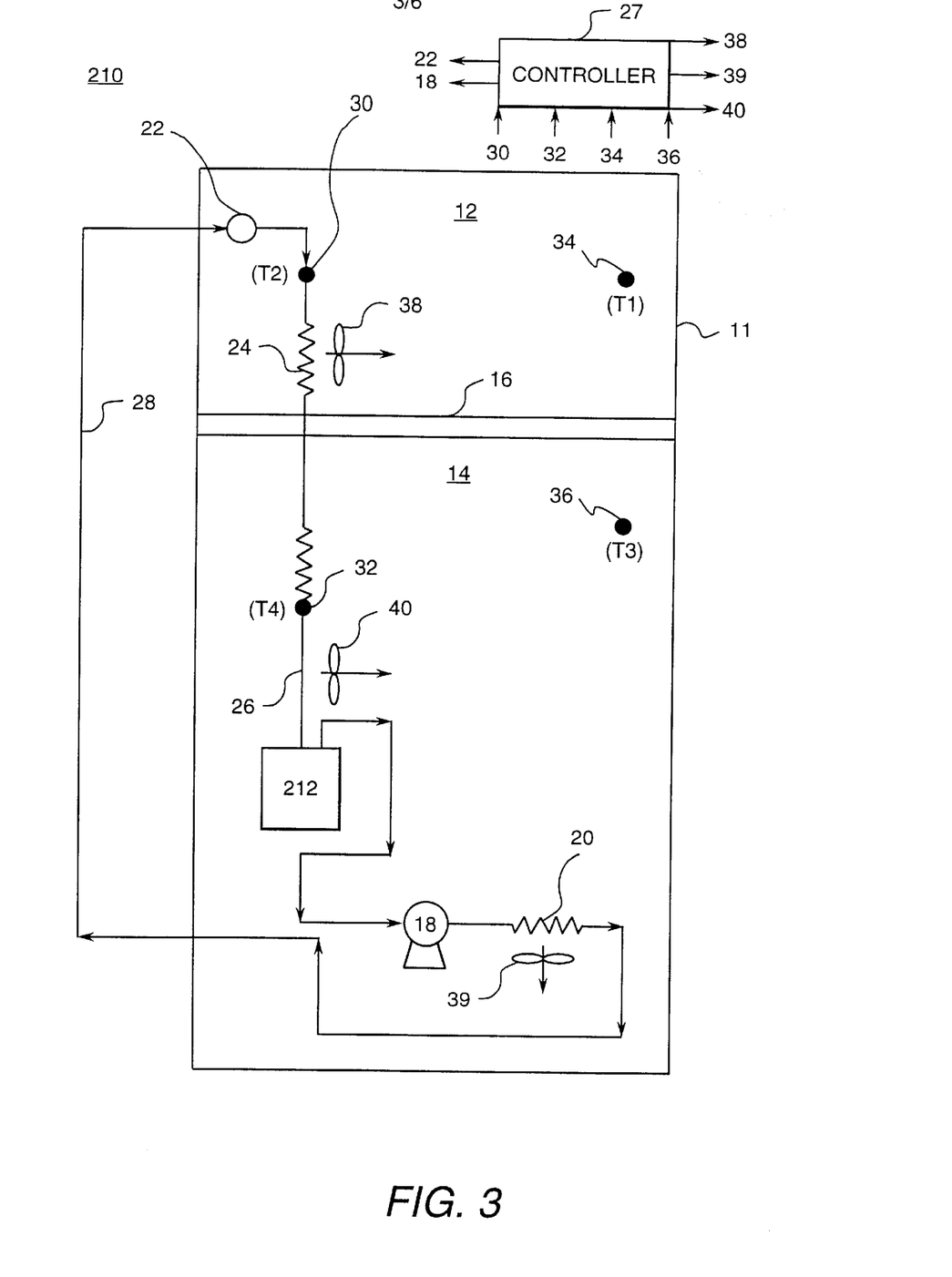
FIG. 3 is another schematic cross-sectional side elevation view of an illustrative embodiment of the instant invention.

FIG. 3 shows another embodiment of a refrigeration system 210 comprising compressor 18, condenser 20, control valve 22, freezer evaporator 24, and fresh food evaporator 26. Refrigeration system 210 is similar to refrigeration system 10 of FIG. 1, except that refrigeration system 210 further comprises an accumulator 212 that capture excess liquid refrigerant that does not boil off in fresh food evaporator 26.

For purposes of clarity, the operation of refrigeration system 210 will be discussed in terms of a FREEZER MODE and a FRESH FOOD MODE. Although the exemplary embodiments will be discussed in terms of a FREEZER MODE and a FRESH FOOD MODE, the invention is not limited to these modes. In fact, the present invention can be implemented and utilized with many other modes of operation.

Another current problem with some commercially available refrigerators is that frost builds up on the fresh food evaporator requiring a defrost heater, a timer and a terminator to eliminate this problem. This defrost event consumes energy, adds thermal load, and causes unwanted temperature fluctuations within a refrigeration system.

If the temperature signals ($T_1$) generated by freezer compartment temperature sensor 34 rise above a preset freezer compartment temperature, typically in the range between about −20° C. to about −15° C., controller 27 enters FREEZER MODE.

In accordance with one embodiment of the instant invention, during FREEZER MODE, the average flow rate through control valve 22 is dependent upon the selected duty cycle. Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is close to a saturated vapor. A higher evaporator saturation temperature produces a higher pressure thus a higher vapor density thereby generating a greater compressor mass flow rate.

Controller 27 generates control signals to control valve 22 on the basis of evaporator dryness. The level of dryness (i.e., the amount of liquid refrigerant) indicates whether freezer evaporator 24 requires more refrigerant. The difference between the air temperature in freezer compartment 12 ($T_1$) and the refrigerant temperature at the inlet of freezer evaporator 24 ($T_2$) can be correlated with the evaporator dryness. Generally, as this temperature difference increases, control valve 22 should be opened more to increase the refrigerant flow rate.

In order to ensure that freezer evaporator 24 exit state is a substantially saturated vapor, controller monitors the temperature signals ($T_2$) generated by first liquid line temperature sensor 30 and the temperature signals ($T_1$) generated by freezer compartment temperature sensor 34. Controller 27 ensures a substantially saturated vapor exit state in freezer evaporator 24 by generating signals to control valve 22. This control signal typically comprises a pulse width modulated frequency signal which causes control valve 22 to oscillate between a fully open condition and a fully closed condition such that the duty cycle of the open-to-closed conditions determines the average flow rate through control valve 22. The pulse width is adjusted in accordance with the detected evaporator dryness to maintain dryness at a relatively fixed level. Preferably, the difference between the air temperature in freezer compartment 12 ($T_1$) and the refrigerant temperature at the inlet of freezer evaporator 24 ($T_2$) is held at a fixed delta in the range between about 5° C. to about 10° C. By controlling the duty cycle of control valve 22 to maintain the desired evaporator dryness, optimal system performance is obtained.

If the temperature signals ($T_3$) generated by fresh food compartment temperature sensor 36 rise above a preset fresh food compartment temperature, typically in the range between about 3° C. to about 7° C., controller 27 enters FRESH FOOD MODE.

In order to ensure that fresh food evaporator 26 maintains frost-free conditions, controller 27 monitors the temperature signals generated by second liquid line temperature sensor 33 ($T_4$). Controller 27 ensures substantially frost-free conditions at fresh food evaporator 26 by generating control signals to control valve 22. This control signal typically comprises a pulse width modulated frequency signal which causes control valve 22 to oscillate between a fully open condition and a fully closed condition such that the duty cycle of the open-to-closed conditions determines the average flow rate through control valve 22. The pulse width of control valve 22 is adjusted in accordance with the detected temperature signals generated by second liquid line temperature sensor 33 ($T_4$) in order to maintain the refrigerant temperature at a relatively fixed level. Preferably, the refrigerant temperature ($T_4$) should be maintained at a temperature equal to or greater than 0° C. Because control valve 22 maintains the refrigerant temperature at a nominal value greater than or equal to 0° C., frost formation on fresh food evaporator 26 will be minimized. An additional system component, accumulator 212, must be utilized, however, to avoid excess liquid refrigerant from draining to compressor 18.

Figure 4:
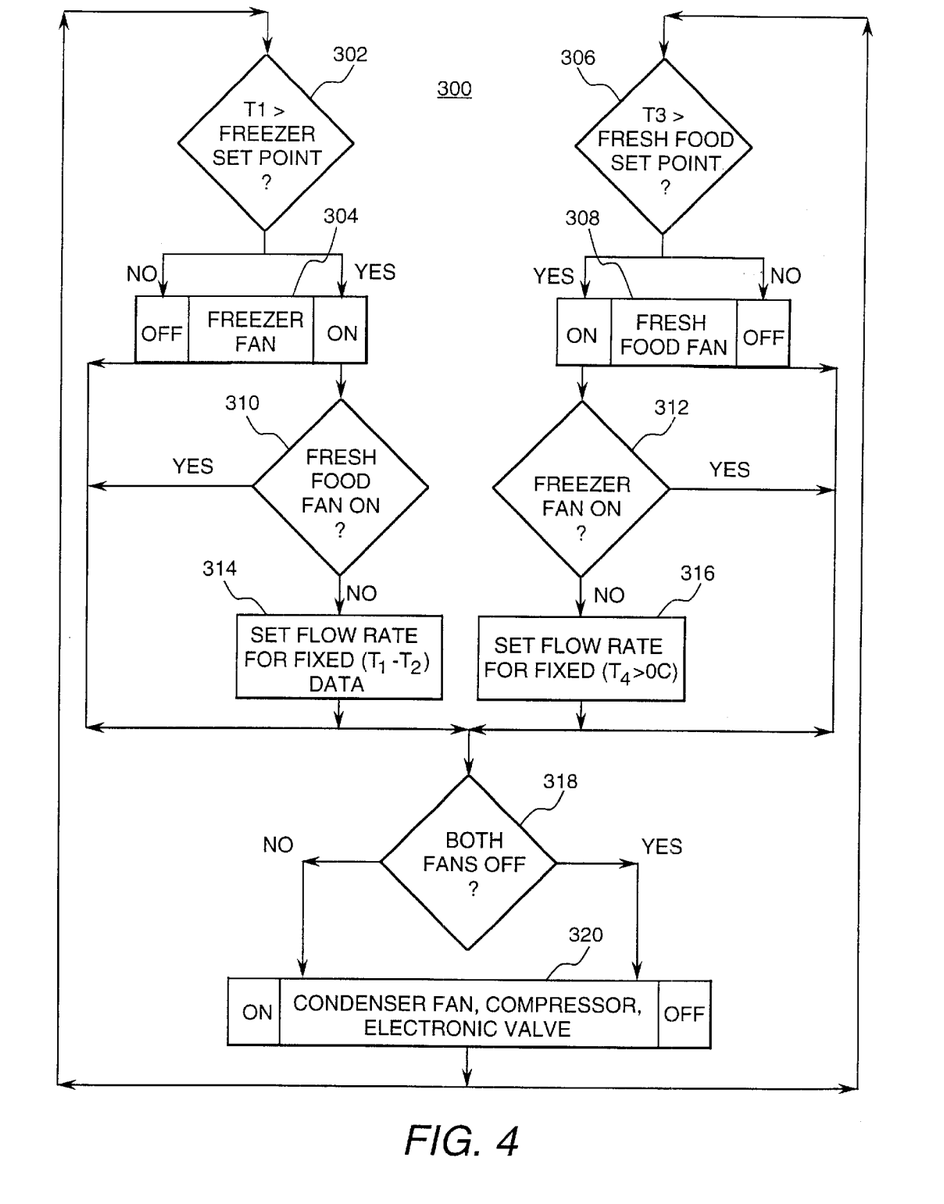
FIG. 4 is another exemplary control logic flowchart in accordance with an embodiment of the instant invention.

An exemplary control logic sequence 300 for refrigeration system 210 is shown in FIG. 4. This control logic sequence is inputted into controller 27, for example, by programming into memory of an application specific integrated circuit (ASIC) or other programmable memory device.

At block 302, the freezer compartment temperature ($T_1$) is monitored by controller 27 through freezer compartment temperature sensor 34. Controller 27 compares the temperature signals generated from freezer compartment temperature sensor 34 with the preset freezer temperature.

If $T_1$ is greater than the preset freezer temperature, the control sequence advances to block 304 and freezer compartment fan 38 is turned on. If, however, $T_1$ is less than or equal to the preset freezer temperature, the control sequence advances to block 304 and freezer compartment fan 38 remains off, or if previously on, freezer compartment fan 38 is turned off.

At block 306, the fresh food compartment temperature $T_3$ is monitored by controller 27 through fresh food compartment temperature sensor 36. Controller 27 compares the temperature signals generated from fresh food compartment temperature sensor 36 with the preset fresh food temperature.

If $T_3$ is greater than the preset fresh food temperature, the control sequence advances to block 308 and fresh food compartment fan 40 is turned on. If, however, $T_3$ is less than or equal to the preset fresh food temperature, the control sequence advances to block 308 and fresh food compartment fan 40 remains off, or if previously on, fresh food compartment fan 40 is turned off.

If, at block 304, freezer compartment fan 38 is turned on, the control sequence advances to block 310 where controller 27 determines if fresh food compartment fan 40 is currently on, indicating cooling is currently taking place within fresh food compartment 14. If fresh food compartment fan 40 is not currently on, the control sequence advances to block 314 and the flow rate of control valve 22 is set for a fixed ($T_1-T_2$) delta as discussed above.

If, at block 304, freezer fan 38 is turned off or remains off, the control sequence advances to block 318 where controller 27 determines if both fans are currently off.

If, at block 308, fresh food compartment fan 40 is turned on, the control sequence advances to block 312 where controller 27 determines if freezer compartment fan 38 is currently on, indicating cooling is currently taking place within freezer compartment 12. If freezer compartment fan 38 is not currently on, the control sequence advances to block 316 and the flow rate of control valve 22 is set for a fixed refrigerant temperature ($T_4$), typically greater than 0° C., as discussed above.

If, at block 308, fresh food compartment fan 40 is turned off or remains off, the control sequence advances to block 318 wherein controller 27 determines if both fans are currently off.

At block 318, controller 27 determines if both fans 38, 40 are currently off. If controller 27 determines that both fans 38, 40 are currently off, the control sequence advances to block 320. At block 320, controller 27 generates a signal to shut off, condenser fan 39, compressor 18 and control valve 22, or if currently off to maintain that status, as neither freezer compartment 12 nor fresh food compartment 14 needs cooling.

If, at block 318, controller 27 determines that both fans are not currently off, the control sequence advances to block 320. At block 320, controller 27 generates a signal to turn on condenser fan 39, compressor 18 and control valve 22, or if currently on to maintain that status, as either freezer compartment 12 or fresh food compartment 14 currently needs cooling.

In an alternative embodiment of refrigeration system 210, control logic system 300 may be a primary control logic sequence. If, however, the cooling of fresh food compartment 14 takes greater than a pre-determined amount of time, for example greater than about 20 minutes to about 30 minutes, control logic sequence may advance to a secondary control logic sequence, for example, control logic sequence 100, as shown in FIG. 2. In control logic sequence 100, fresh food cooling utilizes a fixed $T_3 - T_4$ delta, that is capable of a faster rate of cooling than control logic sequence 300.

Figure 5:
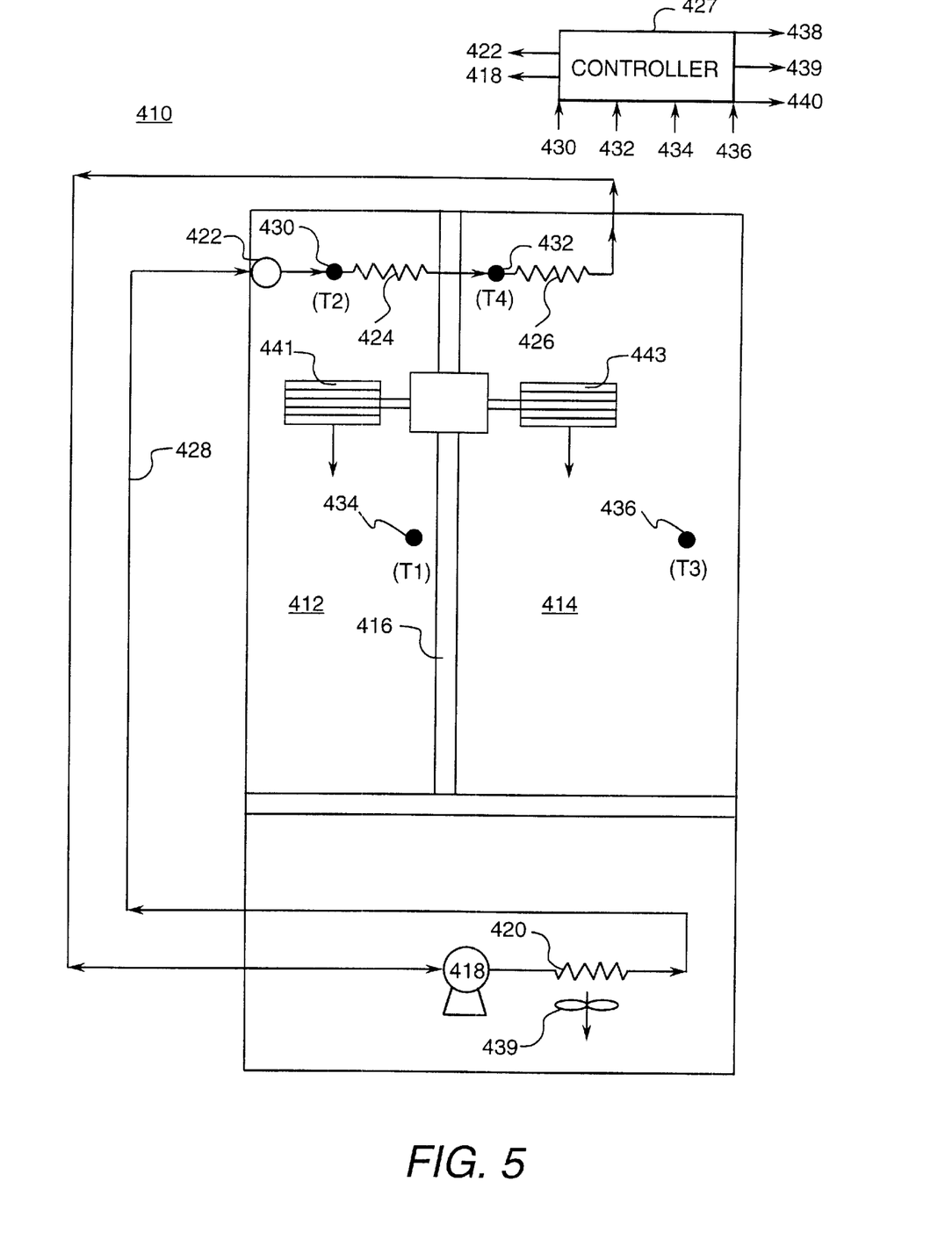
FIG. 5 is another schematic cross-sectional side elevation view of an illustrative embodiment of the instant invention.

An exemplary embodiment of a side-by-side refrigeration system 410 having a freezer compartment 412 separated from and substantially temperature independent of a fresh food compartment 414, is shown in FIG. 5. A mullion 416 separates freezer compartment 412 and fresh food compartment 414. Although the present invention is described herein in connection with refrigeration system 410, the present invention is not limited to practice with refrigeration system 410. In fact, the present invention can be implemented and utilized with many other configurations.

Refrigeration system 410 further comprises a compressor 418, a condenser 420, a control valve 422, a freezer evaporator 424, and a fresh food evaporator 426. Control valve 422 and compressor 418 are each electrically coupled to a controller 427.

Control valve 422 is disposed within a liquid line 428, which liquid line 428 connects condenser 420 and freezer evaporator 424. Control valve 422 is typically positioned adjacent the inlet of freezer evaporator 424 and is the throttling or metering device that controls the operation of refrigeration system 410. Control valve 422 is typically a closed valve, that is, control valve 422 closes when it is not energized.

A first liquid line temperature sensor 430 is disposed so as to detect the temperature of refrigerant prior to entering freezer evaporator 424 and a second liquid line temperature sensor 432 is disposed so as to detect the temperature of refrigerant prior to entering fresh food evaporator 426. Additionally, a freezer compartment temperature sensor 434 and a fresh food compartment temperature sensor 436 are disposed within freezer compartment 412 and fresh food compartment 414, respectively, to sense compartment temperatures. Temperature sensors 430–436 typically comprise solid state sensors such as resistance temperature detectors (RTD), thermocouples, thermistors or the like. Each temperature sensor 430–436 is electrically coupled to controller 427.

For purposes of clarity, the operation of refrigeration system 410 will be discussed in terms of a FREEZER MODE and a FRESH FOOD MODE. Although the exemplary embodiments will be discussed in terms of a FREEZER MODE and a FRESH FOOD MODE, the invention is not limited to these modes. In fact, the present invention can be implemented and utilized with many other modes of operation.

During operation, freezer compartment temperature sensor 434 and fresh food compartment temperature sensor 436 generate temperature signals, which temperature signals are received by controller 427.

If the temperature signals ($T_1$) generated by freezer compartment temperature sensor 434 rise above a preset freezer compartment temperature, typically in the range between −15° C. to about −20° C., controller 427 enters FREEZER MODE.

During FREEZER MODE, controller 427 generates a compressor signal to activate compressor 418, and a fan signal to activate an evaporator fan motor 438 and a condenser fan 439. Evaporator fan motor 438 is disposed within mullion 416 and simultaneously powers both a freezer compartment fan 441 and a fresh food compartment fan 443 so as to circulate air within freezer compartment 412 and fresh food compartment 414, respectively. Evaporator fan motor 438 may be a single speed, multi-speed or variable speed motor.

High pressure gaseous refrigerant is discharged from compressor 418 and is condensed in condenser 420. The now-liquid refrigerant is expanded through control valve 422 to a lower pressure and flows to freezer evaporator 424. The refrigerant under low pressure, and correspondingly at a low temperature, enters freezer evaporator 424 where the refrigerant is evaporated in a conventional manner. The evaporation of the refrigerant lowers the temperature of the air surrounding freezer evaporator 424. The cooled air is directed by the rotation of freezer compartment fan 441 into freezer compartment 412.

If the temperature signals ($T_1$) generated by freezer compartment temperature sensor 434 drops below preset freezer compartment temperature, cooling is no longer required and controller 427 exits FREEZER MODE. When controller 427 exits FREEZER MODE the controller cuts the power to control valve 422 (unless simultaneously entering FRESH FOOD MODE) causing control valve 422 to move to a closed position, as discussed above If the temperature signals ($T_3$) generated by fresh food compartment temperature sensor 36 rise above a preset fresh food compartment temperature, typically in the range between about 3° C. to about 7° C., controller 27 enters FRESH FOOD MODE.

During FRESH FOOD MODE, controller 427 generates a compressor signal to activate compressor 418 and a condenser fan 39, a control signal to energize control valve 422, and a fan signal to activate evaporator fan motor 438. High pressure gaseous refrigerant is discharged from compressor 418 and is condensed in condenser 420. The now-liquid refrigerant is expanded through control valve 422 to a lower pressure and flows to fresh food evaporator 426. The refrigerant under low pressure, and correspondingly at a low temperature, enters fresh food evaporator 426 where the refrigerant is evaporated in a conventional manner. The evaporation of the refrigerant lowers the temperature of the air surrounding fresh food evaporator 426. The cooled air is directed by the rotation of fresh food compartment fan 443 into fresh food compartment 414.

If the temperature signals ($T_3$) generated by fresh food compartment temperature sensor 436 drop below preset fresh food compartment temperature, cooling is no longer required and controller 427 exits FRESH FOOD MODE. When controller 427 exits FRESH FOOD MODE the controller cuts the power to control valve 422 (unless simultaneously entering FREEZER MODE) causing control valve 422 to move to a closed position, as discussed above.

In accordance with one embodiment of the instant invention, during FREEZER MODE, the average flow rate through control valve 422 is dependent upon the selected duty cycle. Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is close to a saturated vapor. A higher evaporator saturation temperature produces a higher pressure thus a higher vapor density thereby generating a greater compressor mass flow rate.

To support a higher compressor mass flow rate, controller 427 generates a signal to control valve 422 so that the time ($t_1$) control valve 422 is fully open is increased with respect to the time ($t_2$) control valve is fully closed, thereby producing a larger average flow rate. To support a lower compressor mass flow rate, controller 427 generates a signal to control valve 422 so that the time ($t_1$) control valve 422 is fully open is lessened with respect to the time ($t_2$) control valve 422 is fully closed, thereby producing a relatively lower average flow rate.

Controller 427 generates control signals to control valve 422 on the basis of evaporator dryness. The level of dryness (i.e., the amount of liquid refrigerant) indicates whether freezer evaporator 424 requires more refrigerant. The difference between the air temperature in freezer compartment 412 and the refrigerant temperature at the inlet of freezer evaporator 424 can be correlated with evaporator dryness. Generally, as this temperature difference increases, control valve 422 should be opened more to increase the refrigerant flow rate.

In order to ensure that freezer evaporator 424 exit state is a substantially saturated vapor, controller 427 monitors the temperature signals generated by first liquid line temperature sensor 430 ($T_2$) and the temperature signals generated by freezer compartment temperature sensor 434 ($T_1$). Controller 427 ensures a substantially saturated vapor exit state in freezer evaporator 424 by generating control signals to control valve 422. The control signals typically comprise a pulse width modulated frequency signal which causes control valve 422 to oscillate between a fully open condition and a fully closed condition such that the duty cycle of the open-to-closed conditions determines the average flow rate through control valve 422. The pulse width is adjusted in accordance with the detected evaporator dryness to maintain dryness at a relatively fixed level. Preferably, the difference between the air temperature in freezer compartment 412 ($T_1$) and the refrigerant temperature at the inlet of freezer evaporator 424 ($T_2$) is held at a fixed delta in the range between about 5° C. to about 10° C. By controlling the duty cycle of control valve 422 to maintain the desired evaporator dryness, optimal system performance is obtained.

In accordance with one embodiment of the instant invention, during FRESH FOOD MODE, the average flow rate through control valve 422 is dependent upon the selected duty cycle. Higher evaporator refrigerant saturation temperature is desirable since the higher the saturation temperature, the greater the obtainable cycle efficiency. The cycle efficiency, however, will only be greater for higher temperatures if the evaporator exit state is such that the refrigerant is close to a saturated vapor. A higher evaporator saturation temperature produces a higher pressure thus a higher vapor density thereby generating a greater compressor mass flow rate.

In order to ensure that fresh food evaporator 426 exit state is a substantially saturated vapor, controller 427 monitors the temperature signals generated by second liquid line temperature sensor 433 ($T_4$) and the temperature signals generated by fresh food compartment temperature sensor 436 ($T_3$). Controller 427 ensures a substantially saturated vapor exit state in fresh food evaporator 426 by generating signals to control valve 422. This control signal typically comprises a pulse width modulated frequency signal which causes control valve 422 to oscillate between a fully open condition and a fully closed condition such that the duty cycle of the open-to-closed conditions determines the average flow rate through control valve 422. The pulse width is adjusted in accordance with the detected evaporator dryness to maintain dryness at a relatively fixed level. Preferably, the difference between the air temperature in fresh food compartment 414 ($T_3$) and the refrigerant temperature at the inlet of fresh food evaporator 424 ($T_4$) is held at a fixed delta in the range between about 5° C. to about 15° C. By controlling the duty cycle of control valve 422 to maintain the desired evaporator dryness, optimal system performance is obtained.

Figure 6:
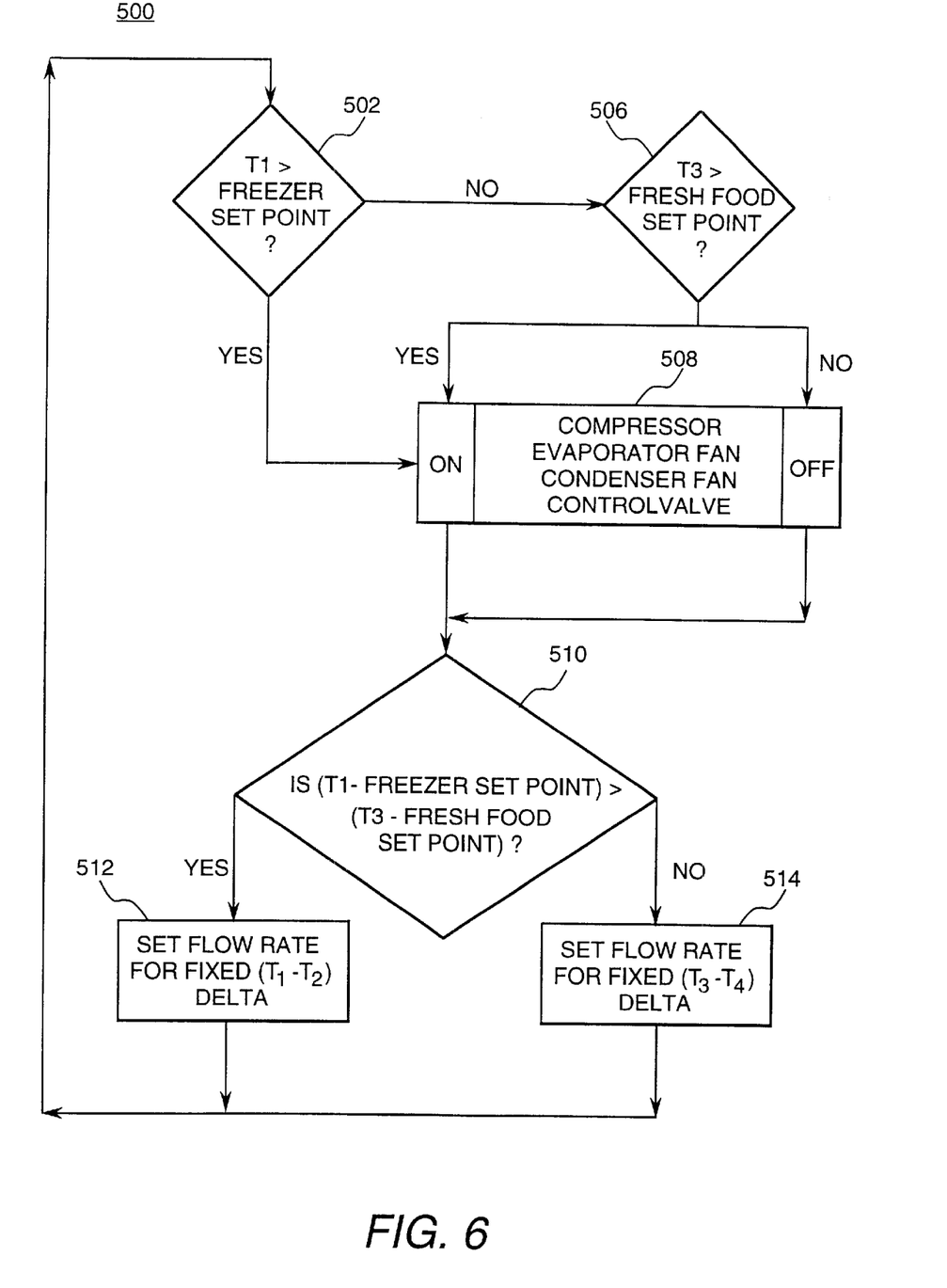
FIG. 6 is another exemplary control logic flowchart in accordance with an embodiment of the instant invention.

An exemplary adaptive control logic sequence 500 for refrigeration system 410 is shown in FIG. 6. This control logic sequence is inputted into controller 427, for example, by programming into memory of an application specific integrated circuit (ASIC) or other programmable memory device. As used herein, the term "adaptive control" is defined as a control system that changes system parameters in a way so as to improve the performance of a system.

At block 502, the freezer compartment temperature ($T_1$) is monitored by controller 427 through freezer compartment temperature sensor 434. Controller 427 compares the temperature signals generated from freezer compartment temperature sensor 434 with the predetermined preset freezer temperature.

If $T_1$ is greater than the preset freezer temperature, the control sequence advances to block 508 and compressor 418 evaporator fan motor 438 and condenser fan 439 are turned on and control valve 422 is energized. If, however, $T_1$ is less than or equal to the preset freezer temperature, the control sequence advances to block 506.

At block 506, the fresh food compartment temperature $T_3$ is monitored by controller 427 through fresh food compartment temperature sensor 436. Controller 427 compares the temperature signals generated from fresh food temperature sensor 436 with the preset fresh food temperature.

If $T_3$ is greater than the preset fresh food temperature, the control sequence advances to block 508 and compressor 418, evaporator fan motor 438 and condenser fan 439 are turned on and control valve 422 is energized. If, however, $T_3$ is less than or equal to the preset freezer temperature, the control sequence advances to block 508 and compressor 418, evaporator fan motor 438 and condenser fan 439 remain off and control valve 422 is not energized or if previously on, compressor 418, evaporator fan motor 438 and condenser fan 439 are shut off and the power to control valve 422 is cut off.

If, at block 508, compressor 418, evaporator fan motor 438 and condenser fan 439 are turned on and control valve 422 is energized, the control sequence advances to block 510 where controller 427 determines if the freezer compartment temperature ($T_1$) minus the freezer set point is greater than the fresh food compartment temperature ($T_3$) minus the fresh food set point.

If, at block 510 controller 427 determines that freezer compartment temperature ($T_1$) minus the freezer set point is greater than the fresh food compartment temperature ($T_3$) minus the fresh food set point, the flow rate of control valve 422 is set for a fixed ($T_1$-$T_2$) delta, as discussed above.

If, at block 510 controller 427 determines that freezer compartment temperature ($T_1$) minus the freezer set point is less than the fresh food compartment temperature ($T_3$) minus the fresh food set point, the flow rate of control valve 422 is set for a fixed ($T_3$-$T_4$) delta, as discussed above.

The logic of block 510 is used to distribute the cooling capacity of refrigeration system 410 in such a way as to satisfy the cooling demand of both compartments within the same approximate time period. By adjusting the refrigerant flow rate with control valve 422, the evaporator pressure and temperature, can be controlled. Increasing refrigerant flow raises both evaporator temperatures and provides more cooling to fresh food compartment 314, by limiting the temperature difference between the freezer air and freezer evaporator. Decreasing refrigerant flow lowers both evaporator temperatures and provides more cooling to the freezer by limiting the amount of liquid refrigerant flowing into the fresh food evaporator. In this embodiment, there are two discrete selections of the temperature difference used to generate control signals to control valve 422 provided in blocks 512 and 514. Alternatively, control valve 422 duty cycle is adjusted continuously to maintain a balanced cooling capacity between the two compartments using a proportional, differential, or integral value of the unbalance error, or any combination thereof, between the freezer demand ($T_1$-freezer set point) and fresh food demand ($T_3$-fresh food set point).

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method of refrigeration control comprising the following method steps:
    monitoring temperatures of a fresh food compartment and a freezer compartment and comparing said compartment temperatures with preset compartment temperatures;
    energizing a fresh food compartment fan when said fresh food compartment temperature is greater than said preset compartment temperature;
    energizing a freezer compartment fan when said freezer compartment temperature is greater than said preset compartment temperature;
    de-energizing said fresh food compartment fan when said fresh food compartment temperature is less than or equal to said preset compartment temperature;
    de-energizing said freezer compartment fan when said freezer compartment temperature is less than or equal to said preset compartment temperature
    determining whether each respective compartment fan is currently energized;
    setting the flow rate of a control valve disposed at an inlet of a freezer evaporator for a fixed ($T_1$-$T_2$) delta if said freezer compartment fan is energized and said fresh food fan deenergized, or if said fresh food compartment fan is energized after said freezer compartment fan is energized; and
    setting the flow rate of said control valve for a fixed ($T_3$-$T_4$) delta if said fresh food compartment fan is energized and said freezer compartment fan is deenergized or if said freezer compartment fan is energized after said fresh food compartment fan is energized;
    wherein $T_1$ is a freezer compartment temperature, $T_2$ is a refrigerant temperature at the inlet of said freezer evaporator, $T_3$ is a fresh food compartment temperature, and $T_4$ is a refrigerant temperature at the inlet of a fresh food evaporator.

2. A method of refrigeration control in accordance with claim 1, wherein said control logic sequence is inputted into a controller by programming into memory of an application specific integrated circuit.

3. A method of refrigeration control comprising the following method steps:
    monitoring temperatures of a fresh food compartment and a freezer compartment and comparing said compartment temperatures with preset compartment temperatures;
    energizing a fresh food compartment fan when said fresh food compartment temperature is greater than said preset compartment temperature;
    energizing a freezer compartment fan when said freezer compartment temperature is greater than said preset compartment temperature;
    de-energizing said fresh food compartment fan when said fresh food compartment temperature is less than or equal to said preset compartment temperature;
    de-energizing said freezer compartment fan when said freezer compartment temperature is less than or equal to said preset compartment temperature
    determining whether each respective compartment fan is currently energized;
    setting the flow rate of a control valve disposed at an inlet of a freezer evaporator for a fixed ($T_1$-$T_2$) delta if said freezer compartment fan is energized and said fresh food compartment fan deenergized, or if said fresh food compartment fan is energized after said freezer compartment fan is energized; and
    setting the flow rate of said control valve for a fixed $T_4>0°$ C. if said fresh food compartment fan is energized and said freezer fan is deenergized or if said freezer compartment fan is energized after said fresh food compartment fan is energized;
    wherein $T_1$ is a freezer compartment temperature, $T_2$ is a refrigerant temperature at the inlet of said freezer evaporator and $T_4$ is a refrigerant temperature at the inlet of a fresh food evaporator.

4. A method of refrigeration control in accordance with claim 3, wherein if the cooling of said fresh food compartment takes greater than a predetermined amount of time then the flow rate of said control valve is set at a fixed ($T_3$-$T_4$) delta wherein $T_3$ is a fresh food compartment temperature.

5. A method of refrigeration control comprising the following method steps:
    monitoring temperatures of a fresh food compartment and a freezer compartment and comparing said compartment temperatures with preset compartment temperatures;

energizing a fresh food compartment fan when said fresh food compartment temperature is greater than said preset compartment temperature;

energizing a freezer compartment fan when said freezer compartment temperature is greater than said preset compartment temperature;

de-energizing said fresh food compartment fan when said fresh food compartment temperature is less than or equal to said preset compartment temperature;

de-energizing said freezer compartment fan when said freezer compartment temperature is less than or equal to said preset compartment temperature determining whether said freezer compartment temperature minus the preset freezer compartment temperature is greater than said fresh food compartment temperature minus the preset fresh food compartment temperature;

setting the flow rate of a control valve disposed at an inlet of a freezer evaporator for a fixed $(T_1-T_2)$ delta if said freezer compartment temperature minus the preset freezer compartment temperature is greater than said fresh food compartment temperature minus the preset fresh food compartment temperature; and setting the flow rate of said control valve for a fixed $(T_3-T_4)$ delta if said fresh food compartment temperature minus the preset fresh food compartment temperature is greater than said freezer compartment temperature minus the preset freezer compartment temperature.

6. A method of refrigeration control in accordance with claim 5, wherein said control logic sequence is inputted into a controller by programming into memory of an application specific integrated circuit.

7. A method of refrigeration control in accordance with claim 5 wherein said control valve duty cycled is continuously adjusted so as to maintain a balanced cooling capacity between each of said compartments.

* * * * *